July 1, 1952  V. L. MARTIN  2,601,684
DETACHABLE BED SUPPORTING FRAME FOR TRUCK BODIES
Filed Jan. 15, 1948  2 SHEETS—SHEET 2
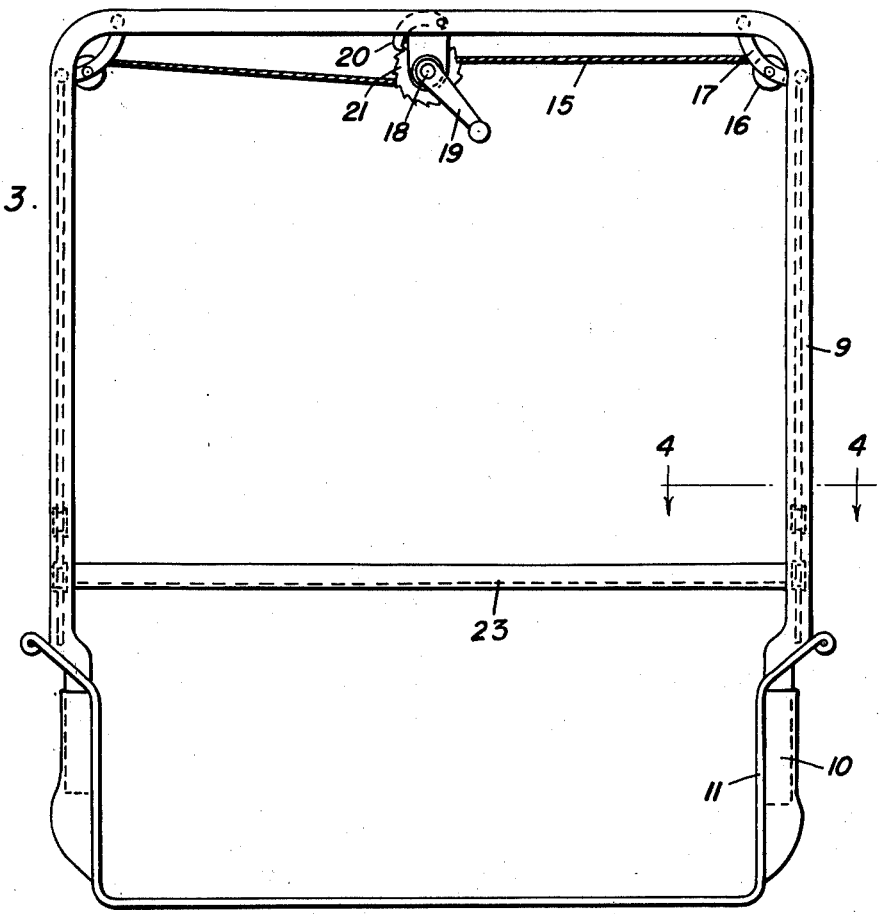
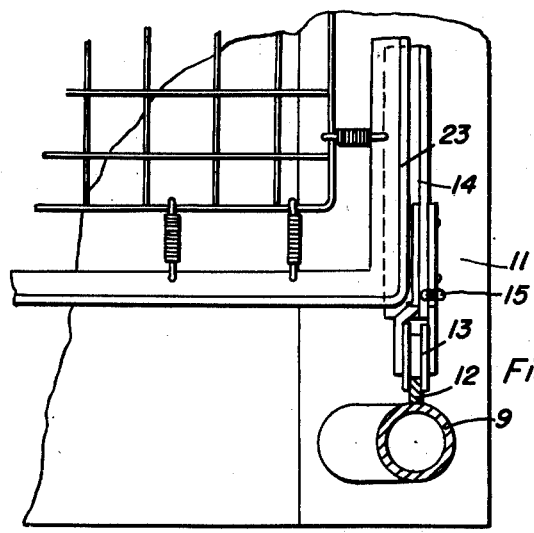
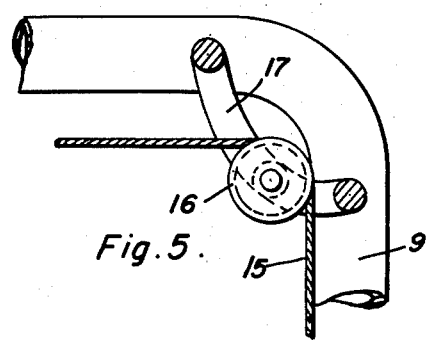
Virgil L. Martin
INVENTOR.

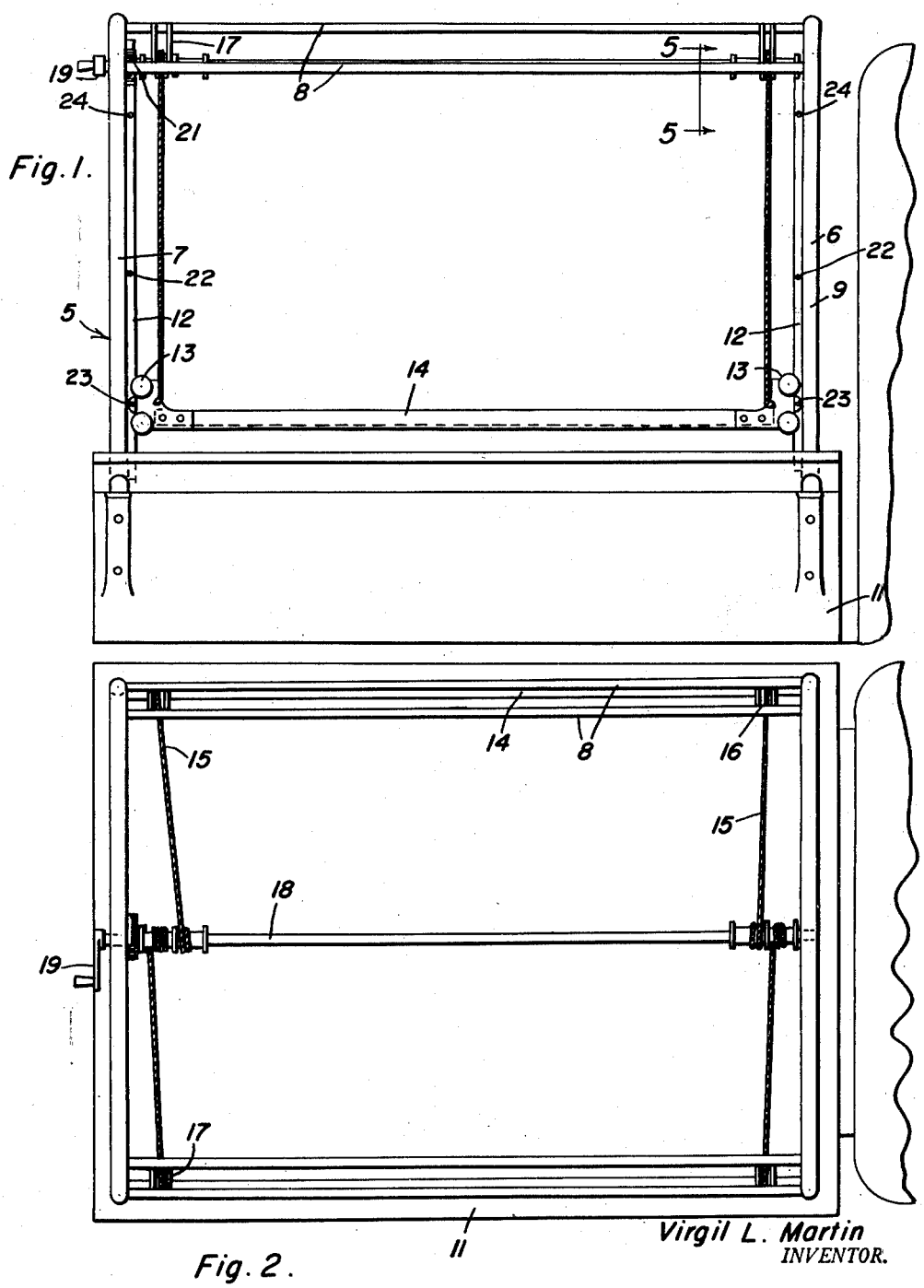

Patented July 1, 1952

2,601,684

UNITED STATES PATENT OFFICE 2,601,684

DETACHABLE BED SUPPORTING FRAME FOR TRUCK BODIES

Virgil L. Martin, Albuquerque, N. Mex.

Application January 15, 1948, Serial No. 2,377

2 Claims. (Cl. 5—119)

1

The present invention relates generally to new and useful improvements in camping beds and more particularly to a bed supporting frame removably mounted in the body of an open or closed truck body whereby to provide comfortable sleeping accommodations for tourists, campers, or other travelers.

An important object of the invention is to provide a bed supporting frame constructed for removably mounting in the body of a light delivery truck and including means whereby a bed spring and mattress supported thereon may be hoisted into an out of the way position at the top of the frame, when not in use.

A further object of the invention is to provide a bed supporting frame of this character on which a canvas covering or canopy may be supported to protect the bed from the weather while traveling from place to place.

A further object of the invention is to provide a bed support of this character which may be easily and quickly mounted into position in the body of a truck without necessitating any changes or alterations in the construction thereof and which may be easily and quickly removed from the truck, when desired.

A still further object is to provide a device of this character of simple and practical construction, which is efficient and reliable in use, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the bed supporting frame mounted in position in a truck body, Figure 2 is a top plan view, Figure 3 is an end elevational view, Figure 4 is an enlarged fragmentary sectional view of one of the corner posts taken substantially on the line 4—4 of Figure 3, and Figure 5 is an enlarged fragmentary vertical sectional view taken substantially on the line 5—5 of Figure 1 and showing one of the guide pulleys for the hoisting cable.

Referring now to the drawings in detail wherein for the purpose of illustration I have disclosed a preferred embodiment of the invention the numeral 5 designates the bed supporting frame generally and which includes inverted U-shaped end frame members 6 and 7 connected to each other at their upper corners by longitudinally extending frame members 8.

The end frame members 6 and 7 provide corner posts 9 which have their lower ends removably inserted in the stake sockets 10 at the front and rear sides of a truck body 11.

The posts 9 at each side of the truck body are provided with vertical tracks 12 positioned in opposed relation with respect to each other and along which grooved rollers 13 journalled at the ends of angle iron side rails 14 are adapted to travel. To the ends of each of the side rails 14 are secured cables 15 which extend upwardly over guide pulleys 16 rotatably supported by brackets 17 at the upper corners of the end frame members 6 and 7. The cables 15 at each side of the frame extend inwardly for winding on a shaft 18 having its ends journalled at the central portion of the end frame members 6 and 7 and extending longitudinally of the truck body. The cables 15 at the opposite sides of the frame are wound oppositely on the shaft to effect simultaneous raising and lowering movement of the side rails 14.

One end of the shaft 18 is provided with a crank handle 19 and a pawl 20 and ratchet 21 secured to the shaft holds the side rails in a raised position or in any desired intermediate vertical position.

Locking pins 22 are also removably insertable through openings 23 carried at the ends of the side rails 14 and openings 24 in adjacent tracks 12 with which said openings 23 may be registered and to also hold the side rails in a raised position at the upper portion of the frame.

In the operation of the device the lower ends of the posts 9 are inserted in the stake sockets 10 of the truck body to rigidly support the frame on the body and a bed spring 23 with the usual mattress is placed in position on the side rails 14 whereby the bed may be used for sleeping purposes when the bed rails are in their lower position. When not in use the bed may be raised by the cables 15 and shafts 18 to support the bed in an out-of-the-way position under the top of the frame.

A canvas cover or canopy (not shown) may be placed over the frame 5 and suitably secured thereto for protecting the frame and bed from the weather.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bed support for open truck bodies having front and rear vertical sockets comprising a pair of laterally spaced inverted U-shaped frame members forming vertical posts fitting in said sockets, rods connecting said members at the upper ends of said posts, vertical tracks on said posts, bed spring supporting side rails extending between said members with end rollers thereon travelling on said tracks, a rotary shaft journaled on said frame members above said rails and extending intermediate said rails parallel therewith, pulleys on said posts above the ends of said rails, pairs of cables oppositely wound in each pair on said shaft adjacent the ends of the shaft and trained over said pulleys and attached to said rails for raising and lowering said rails upon rotation of said shaft in opposite directions, respectively, and a crank on one end of said shaft for rotating the same.

2. A bed support according to claim 1 wherein said tracks are provided with apertures therein and said rails are provided with end apertures for registration with the apertures in said tracks, and pins are provided for insertion in the registered apertures to hold said rails in elevated positions.

VIRGIL L. MARTIN.

REFERENCES CITED

The following references are of record in the file of this patent:

UNITED STATES PATENTS

| Number | Name | Date |
|---|---|---|
| 741,367 | Parish | Oct. 13, 1903 |
| 775,520 | Crigler | Nov. 22, 1904 |
| 796,791 | Anderson | Aug. 8, 1905 |
| 1,227,301 | Ogden | May 22, 1917 |
| 2,228,535 | Renno | Jan. 14, 1941 |
| 2,405,054 | Pringle | July 30, 1946 |
| 2,457,581 | McCain | Dec. 28, 1948 |

FOREIGN PATENTS

| Number | Country | Date |
|---|---|---|
| 7,948 | Great Britain | Apr. 1, 1910 |